(12) United States Patent
Cayol et al.

(10) Patent No.: US 8,521,387 B2
(45) Date of Patent: Aug. 27, 2013

(54) METHOD FOR ASSISTING WITH HILL STARTS

(75) Inventors: Olivier Cayol, Versailles (FR);
Alessandro De Rinaldis, Paris (FR);
Christophe Desfriches, Pacy-sur-Eure (FR); Gerald Leminoux, Longnes (FR);
Mickael Mallet, Montigny-le-Bretonneux (FR)

(73) Assignee: Renault S.A.S., Boulogne-Billancourt (FR)

( * ) Notice: Subject to any disclaimer, the term of this patent is extended or adjusted under 35 U.S.C. 154(b) by 441 days.

(21) Appl. No.: 12/671,767

(22) PCT Filed: Jun. 30, 2008

(86) PCT No.: PCT/FR2008/051204
§ 371 (c)(1),
(2), (4) Date: Apr. 29, 2010

(87) PCT Pub. No.: WO2009/019353
PCT Pub. Date: Feb. 12, 2009

(65) Prior Publication Data
US 2011/0202245 A1  Aug. 18, 2011

(30) Foreign Application Priority Data
Aug. 2, 2007  (FR) ..................................... 07 05676

(51) Int. Cl.
*B60T 8/32* (2006.01)
*B60T 8/18* (2006.01)
*G06F 19/00* (2011.01)

(52) U.S. Cl.
USPC ............. 701/70; 701/124; 180/271; 303/191; 303/192; 303/198

(58) Field of Classification Search
USPC ............... 701/67, 70, 124; 180/271; 303/28, 303/157, 191, 192, 198
See application file for complete search history.

(56) References Cited

U.S. PATENT DOCUMENTS 3,362,758 A * 1/1968 Goerke et al. ............... 303/9.69
4,103,655 A * 8/1978 Coles ............................ 123/481

(Continued)

FOREIGN PATENT DOCUMENTS

DE   36 18 532    12/1986
DE   199 57 269   6/2000

(Continued)

OTHER PUBLICATIONS

U.S. Appl. No. 12/679,489, filed Mar. 23, 2010, De Rinaldis, et al.

*Primary Examiner* — Fadey Jabr
*Assistant Examiner* — Thomas Ingram
(74) *Attorney, Agent, or Firm* — Oblon, Spivak, McClelland, Maier & Neustadt, L.L.P.

(57) ABSTRACT

A method for assisting a motor vehicle with a hill start, the motor vehicle having previously been held stationary when parked by a brake. The method measures inclination of the vehicle, previously establishes a map between engine torque and engine speed, defines, within the map, an authorized zone and a forbidden zone, provides a vehicle engine speed value, provides a vehicle engine torque value, deduces from these coordinates of the engine operating point within the map, and releases the brake automatically only if the coordinates of the operating point lie within the authorized zone of the map.

9 Claims, 2 Drawing Sheets

(56) References Cited

U.S. PATENT DOCUMENTS

| | | | | |
|---|---|---|---|---|
| 4,418,810 A | * | 12/1983 | Windsor | 477/176 |
| 6,829,529 B2 | * | 12/2004 | Trefzer et al. | 701/82 |
| 7,226,389 B2 | * | 6/2007 | Steen et al. | 477/195 |
| 2004/0143383 A1 | * | 7/2004 | Kuepper et al. | 701/51 |
| 2006/0079377 A1 | * | 4/2006 | Steen et al. | 477/186 |
| 2007/0050120 A1 | | 3/2007 | Tabata et al. | |

FOREIGN PATENT DOCUMENTS

| | | | |
|---|---|---|---|
| DE | 10 2006 000422 | | 3/2007 |
| GB | 2342967 A | * | 4/2000 |

* cited by examiner

METHOD FOR ASSISTING WITH HILL STARTS

BACKGROUND

The present invention relates to the field of assisting with hill starts, otherwise called take-offs, for a motor vehicle.

More precisely, the invention relates to a method for assisting with a hill start for a motor vehicle previously held stationary by a brake, the method comprising the steps consisting in:
  measuring the inclination of the vehicle, and
  automatically releasing the brake.

The problem to be solved for such methods is to prevent a possible stalling of the engine. Specifically, for certain engines, in particular low-torque engines, it is possible that the difference between the real engine torque, delivered in particular when the motor vehicle is started, and the engine torque necessary for taking off cannot be compensated for (typically by pressing on the accelerator).

To solve such a problem, it is known practice to use multiple sensors on the motor vehicle.

However, the use of sensors, in addition to their intrinsic cost, in parallel requires sometimes complex electronic management of the data supplied by these sensors, which may furthermore increase the computing time of the electronic control unit (ECU).

BRIEF SUMMARY

The object of the present invention is to remedy these drawbacks by proposing a solution that is simple to apply and aiming to minimize the number of sensors necessary, hence in particular the cost of applying such a method.

With this objective in mind, the device according to the invention, moreover according to the preamble cited above, is essentially characterized in that it also comprises the steps consisting in:
  previously establishing a chart between the engine torque and the engine speed,
  defining in the chart a zone authorized for a hill start and a zone forbidden for such a start,
  providing a value of the engine speed of the vehicle,
  providing a value of the engine torque of the vehicle,
  deducing therefrom the coordinates of the point of operation of the engine in the chart, and
  not automatically releasing the brake unless the coordinates of the point of operation are in the authorized zone of the chart.

By virtue of this feature, only one sensor of the inclination of the motor vehicle may be necessary.

BRIEF DESCRIPTION OF THE DRAWINGS

Other features and advantages of the present invention will appear more clearly on reading the following description given as an illustrative and nonlimiting example made with reference to the appended figures in which.

DETAILED DESCRIPTION

To illustrate the principle of the invention, consideration is given to a motor vehicle previously held stationary by a brake. The brake may be a parking brake or the footbrake of the motor vehicle. That is to say that the invention may be applied irrespective of the type of engine, irrespective of the engine power, and above all irrespective of the type of gearbox.

During a hill start, it is increasingly desirable to obtain assistance with said hill start. In the case of a vehicle parked on an upslope (positive slope) and having to move forward, it is possible, without assistance, for the motor vehicle to move backward for an instant corresponding to the difference between the moment when the driver releases the brake and the moment when the engine torque is sufficient to drive the motor vehicle, and this occurs all the more so when the slope is great and the motor vehicle is laden and therefore has a considerable weight.

Moreover, it may happen, particularly for an engine with low engine torque, that the latter stalls. This stalling is due to the inability of the engine to deliver the torque necessary for the take-off of the motor vehicle, combined with a reduction in the speed of said engine.

To solve these problems with a minimum of sensors, according to the invention, a chart of the engine is established. Such a chart is illustrated in FIG. 1 and corresponds to the engine torque CPL delivered according to the engine speed REG.

Such a chart is obtained for example on an engine test bench before the vehicle is placed in service, or established during running phases of the motor vehicle. Its form and its values depend on the type of engine, so the graphic units are not indicated in FIG. 1.

Figure 1:
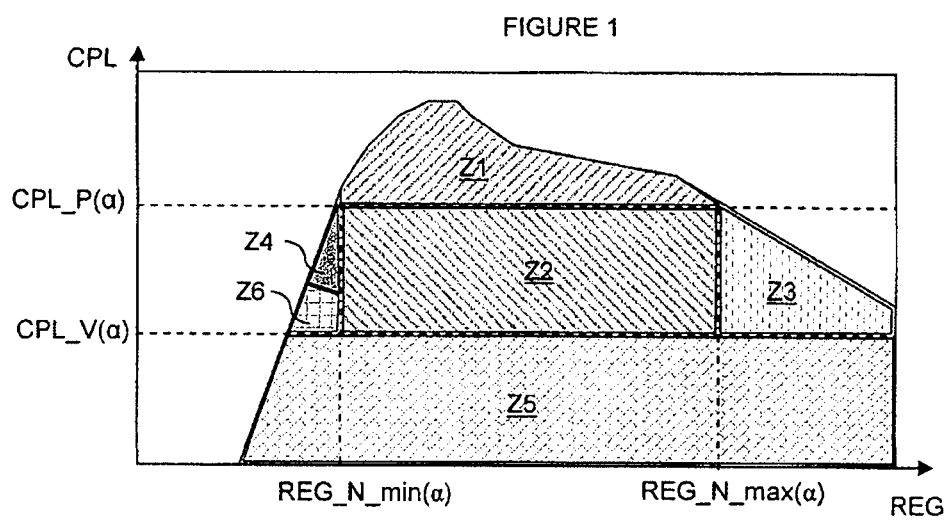
FIG. 1 illustrates an embodiment of a chart according to the invention.

For a given engine, the envelope of its chart, as illustrated in FIG. 1, is independent of the vehicle weight and of the slope on which the latter is likely to be.

One step of the method according to the invention consists in supplying a preferably instantaneous value of the engine speed of the vehicle. This step is advantageously applied by the measurement of said speed, by any means known to those skilled in the art.

Another step of the method according to the invention consists in supplying a preferably instantaneous value of the engine torque of the vehicle. This step is advantageously applied by an estimate of said torque, by any means known to those skilled in the art, including for example by measurement of the injection time.

Once the values of torque CPL(t) and of speed REG(t) are established at a given moment t, another step of the method according to the invention consists in deducing therefrom the coordinates of the operating point at the time t of the engine in the chart.

The coordinates of the operating point at the time t are advantageously established in real time.

According to the invention, one step consists in defining in the chart an authorized zone and a forbidden zone. These zones are described subsequently and correspond in this instance in FIG. 1 to the subzones Z1, Z2, Z3 and Z4 for the authorized zone, and to the subzones Z5 and Z6 for the forbidden zone.

The authorized zone corresponds to the zone in which the engine, through the driver of the motor vehicle or through means of control for this purpose, is capable of achieving an engine speed allowing it to deliver sufficient torque for the take-off, that is to say sufficient to overcome the slope and the dispersions (dispersion of the slope sensor, of vehicle weight, of the engine speed and of the engine torque).

Once obtained, the coordinates of the operating point then make it possible to position the latter in the chart and to deduce therefrom whether this point is positioned in the authorized zone or in the forbidden zone.

If the coordinates of the operating point are in the authorized zone of the chart, the brake is automatically released, for example control means can transmit a signal to this effect.

It should be noted that, in one embodiment, the motor vehicle is fitted with a footbrake and with means for controlling said footbrake configured to keep the pressure on said brake, hence hold the motor vehicle, between the moment when the driver releases said brake and the moment when the engine torque is sufficient to drive the motor vehicle. In this embodiment, the command means operate the means for controlling said footbrake.

Thanks to the invention, it is possible to use only one sensor, making it possible to measure the inclination of the vehicle.

Measuring the inclination of the vehicle, that is to say the slope $\alpha$ on which the latter is situated, advantageously makes it possible to define the authorized zone and the forbidden zone in a dynamic manner as described below.

Thanks to the invention, it is possible to apply assistance with take-off, without measuring or estimating the weight of the motor vehicle.

However, the weight of the motor vehicle has an influence on the torque needed to be delivered by the engine to allow take-off.

Therefore, in a schematic manner, the steeper the slope and the heavier the motor vehicle, the more engine torque must be delivered to allow take-off.

To be able to dispense with the need to know the vehicle weight, the authorized zone and the forbidden zone are advantageously defined as described below.

Specifically, when the chart is established, in particular its envelope, for example on a test bench, it is not possible to know what will be the laden weight of the motor vehicle, the latter depending on the number and the weight of any passengers, and of any baggage.

However, usually in a regulatory manner, a minimal weight of the motor vehicle, called the unladen weight, and a maximal authorized laden weight, called the laden weight, is defined. These weights are known for a given motor vehicle.

According to the invention, it is therefore possible to define a maximal take-off torque $CPL\_P(\alpha)$ and a minimal take-off torque $CPL\_V(\alpha)$, illustrated in FIG. 1.

The maximal take-off torque $CPL\_P(\alpha)$ corresponds to the engine torque necessary to make a motor vehicle take off when laden.

The minimal take-off torque $CPL\_V(\alpha)$ corresponds to the engine torque necessary to make an unladen motor vehicle take off.

As seen above, these two engine torques $CPL\_P(\alpha)$ and $CPL\_V(\alpha)$ depend on the slope $\alpha$.

Therefore, for two slopes $\alpha 1$ and $\alpha 2$ such that $\alpha 2 > \alpha 1$, $CPL\_P(\alpha 2) > CPL\_P(\alpha 1)$ and $CPL\_V(\alpha 2) > CPL\_V(\alpha 1)$.

Measuring the slope $\alpha$, that is to say the inclination of the vehicle, makes it possible to determine the values of the thresholds of laden take-off torque $CPL\_P(\alpha)$ and of unladen take-off torque $CPL\_V(\alpha)$, which will have been calibrated in advance.

Thanks to these threshold values, it is possible advantageously to define dynamically the authorized zone and the forbidden zone in the chart.

Accordingly, typically, the forbidden zone comprises a first subzone (Z5 in FIG. 1) corresponding to any delivered engine torque value that is below the unladen take-off torque $CPL\_V(\alpha)$, irrespective of the engine speed.

If the coordinates of the operating point correspond to a point in subzone Z5, it is then considered, according to the invention, that the delivered engine torque is insufficient for the unladen take-off and that, in these conditions, the brake must not be automatically released.

Advantageously, it is therefore possible to subdivide the authorized zone and/or the forbidden zone into a plurality of subzones.

Accordingly, the authorized take-off zone comprises in particular a range including any point of operation the coordinates of which are such that the delivered engine torque is greater than the unladen take-off torque $CPL\_V(\alpha)$, and the engine speed of which is greater than the minimal nominal engine speed $REG\_N\_min(\alpha)$ (FIG. 1).

This range corresponds to the subzones Z1, Z2 and Z3 in FIG. 1.

More precisely, the authorized zone may therefore include a first subzone Z1 in which the engine torque is greater than the laden take-off torque $CPL\_P(\alpha)$ corresponding to the total of the unladen take-off torque $CPL\_V(\alpha)$ and the dispersion torque $CPL\_P(\alpha)-CPL\_V(\alpha)$.

The intersection of the envelope of the chart and the value of the laden take-off torque $CPL\_P(\alpha)$ defines two engine speeds: a maximal nominal engine speed $REG\_N\_max(\alpha)$ and a minimal nominal engine speed $REG\_N\_min(\alpha)$.

The minimal nominal engine speed $REG\_N\_min(\alpha)$ is the engine speed short of which the engine torque is below the laden take-off torque $CPL\_P(\alpha)$.

The maximal nominal engine speed $REG\_N\_max(\alpha)$ is the engine speed beyond which the delivered engine torque becomes less than the laden take-off torque $CPL\_P(\alpha)$.

As seen above, the laden take-off torque $CPL\_P(\alpha)$ and the unladen take-off torque $CPL\_V(\alpha)$ advantageously depend on the slope $\alpha$. Consequently, the minimal nominal engine speed $REG\_N\_min(\alpha)$ and the maximal nominal engine speed $REG\_N\_max(\alpha)$ depend likewise advantageously on the slope $\alpha$.

The authorized zone may comprise a second subzone Z2 in which the engine torque is greater than the unladen take-off torque $CPL\_V(\alpha)$ (and less than the laden take-off torque $CPL\_P(\alpha)$), and the engine speed between the minimal nominal engine speed $REG\_N\_min(\alpha)$ and the maximal nominal engine speed $REG\_N\_max(\alpha)$.

The authorized zone may comprise a third subzone Z3 in which the engine speed is greater than the maximum nominal speed $REG\_N\_max(\alpha)$ and the engine torque is greater than the unladen take-off torque $CPL\_V(\alpha)$.

This third subzone Z3 forms part of the authorized zone because, even through the delivered engine torque is in this subzone below the laden take-off torque $CPL\_P(\alpha)$, a simple lowering of the engine speed, by the driver of the motor vehicle or in a controlled manner, easily makes it possible to find an engine speed between the minimal nominal engine speed $REG\_N\_min(\alpha)$ and the maximal nominal engine speed $REG\_N\_max(\alpha)$ corresponding to the first subzone Z1 or to the second subzone Z2, hence corresponding to the ability to deliver an engine torque sufficient for the take-off of the motor vehicle.

The authorized zone may also comprise a fourth subzone Z4 in which the engine torque is greater than the total of the unladen take-off torque $CPL\_V(\alpha)$, the speed-increase torque and the movement-limit torque, and in which the engine speed is below the minimal nominal engine speed $REG\_N\_min(\alpha)$.

In this subzone Z4, although the engine speed is below the minimal nominal engine speed $REG\_N\_min(\alpha)$, it is considered that, since the delivered engine torque is greater than the total of the unladen take-off torque $CPL\_V(\alpha)$, the speed-increase torque, and the movement-limit torque, the torque necessary for the engine speed to reach the minimal nominal engine speed REG_N_min(α) is capable of being delivered by the engine.

Conversely, if the delivered engine torque is below the total of the unladen take-off torque CPL_V(α), the speed-increase torque, and the movement-limit torque; and the engine speed is below the minimal nominal engine speed REG_N_min(α), the torque necessary for the engine speed to reach the minimal nominal engine speed REG_N_min(α) is not capable of being delivered by the engine and it is considered that take-off must not be authorized (subzone Z6) because the motor vehicle is likely to stall.

Figure 2:
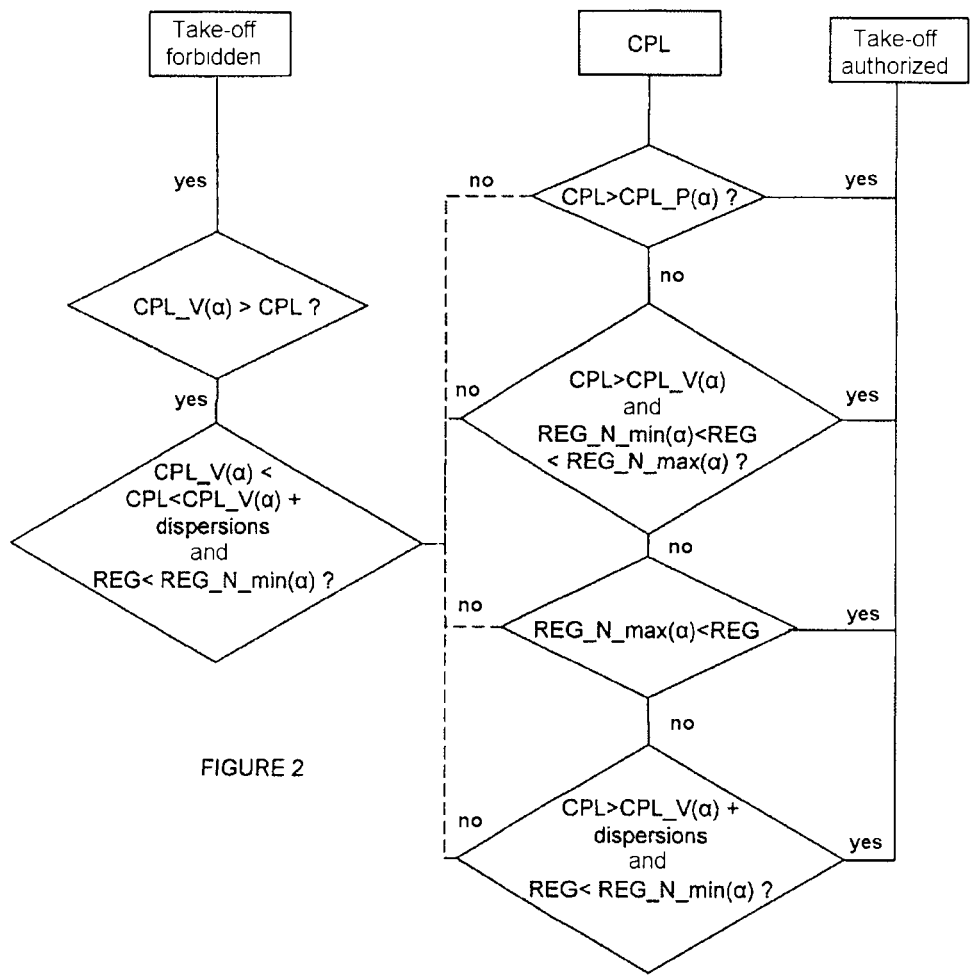
FIG. 2 illustrates an embodiment of the method according to the invention.

The invention can be illustrated also in a flow chart manner in FIG. 2.

FIG. 2 illustrates an embodiment of the method according to the invention, in particular in algorithmic form.

The algorithm according to the invention is advantageously applied by a computer program. The computer program according to the invention comprises program code instructions for the execution of the steps of the method as defined above when said program is executed on a computer.

In a first step, a value of the engine torque CPL is supplied.

Then, in a second step, the value of the engine torque is compared with the laden take-off torque CPL_P(α). If the difference is positive, take-off is authorized. This step makes it possible to determine whether the coordinates of the point of operation are in the subzone Z1.

Otherwise, a computation is made to determine whether the engine torque CPL is greater than the unladen take-off torque CPL_V(α), and whether the engine speed is between the minimal nominal engine speed REG_N_min(α) and the maximal nominal engine speed REG_N_max(α).

In the affirmative, take-off is authorized. This step makes it possible to determine whether the coordinates of the point of operation are in the subzone Z2.

In the negative, still with CPL>CPL_V(α), the speed REG is compared with the maximal nominal engine speed REG_N_max(α).

If the speed REG>REG_N_max(α), then take-off is authorized. This step makes it possible to determine whether the coordinates of the point of operation are in the subzone Z3.

If the speed REG<REG_N_min(α), and the engine torque CPL is greater than the total of the unladen take-off torque CPL_V(α), the speed-increase torque, and the movement-limit torque, then take-off is authorized. This step makes it possible to determine whether the coordinates of the point of operation are in the subzone Z4.

If the delivered engine torque CPL is below the total of the unladen take-off torque CPL_V(α), the speed-increase torque, and the movement-limit torque; and if REG<REG_N_min(α), take-off is forbidden. This step makes it possible to determine whether the coordinates of the point of operation are in the subzone Z6.

Similarly, if the delivered engine torque CPL is below the unladen take-off torque CPL_V(α), take-off is forbidden. This step makes it possible to determine whether the coordinates of the point of operation are in the subzone Z5.

The steps mentioned above are not necessarily sequential. If they are sequential, other sequences for the order of the steps are possible.

The invention claimed is:

1. A method for assisting with a hill start for a motor vehicle, the method comprising:
   holding the vehicle stationary by a brake;
   measuring inclination of the vehicle;
   previously establishing a chart between engine torque and engine speed of the vehicle independently of the measured inclination of the vehicle;
   determining, by a computer, an unladen take-off torque, the unladen take-off torque being a torque necessary to make the motor vehicle take off when at an unladen weight, a laden take-off torque, the laden take-off torque being a torque necessary to make the motor vehicle take off when at a laden weight, a minimal nominal engine speed, and a maximal nominal engine speed for the measured inclination;
   defining, based on the unladen take-off torque, the laden take-off torque, the minimal nominal engine speed, and the maximal nominal engine speed, in the chart a zone authorized for a hill start and a zone forbidden for the hill start;
   providing a value of engine speed of the vehicle;
   providing a value of engine torque of the vehicle;
   deducing therefrom coordinates of a point of operation of the engine in the chart;
   automatically releasing the brake of the vehicle when the coordinates of the point of operation are in the authorized zone of the chart; and
   maintaining the brake when the coordinates of the point of operation are in the forbidden zone.

2. The method as claimed in claim 1, wherein the automatically releasing the brake is applied only if at least the value of the engine torque is greater than or equal to the unladen take-off torque of the motor vehicle.

3. The method as claimed in claim 1, wherein the authorized zone comprises a first subzone in which the engine torque is greater than the laden take-off torque corresponding to the total of the unladen take-off torque and a dispersion torque.

4. The method as claimed in claim 1, wherein the authorized zone comprises a second subzone in which:
   the engine torque is greater than the unladen take-off torque, and
   the engine speed is between the minimal nominal engine speed and the maximal nominal engine speed.

5. The method as claimed in claim 1, wherein the authorized zone comprises a second subzone in which:
   the engine speed is greater than the maximal nominal speed, and
   the engine torque is greater than the unladen take-off torque.

6. The method as claimed in claim 1, wherein the unladen weight of the vehicle is a minimal weight previously known for the vehicle.

7. The method as claimed in claim 1, wherein the laden weight of the vehicle is a maximal authorized laden weight previously known for the vehicle.

8. The method as claimed in claim 1, wherein the minimal nominal engine speed is an engine speed below which a delivered engine torque becomes less than the laden take-off torque.

9. The method as claimed in claim 1, wherein the maximal nominal engine speed is an engine speed above which a delivered engine torque becomes less than the laden take-off torque.

* * * * *